(No Model.)
W. R. SMITH.
FRICTION CLUTCH.
No. 529,314.　　　　　　　　　Patented Nov. 13, 1894.
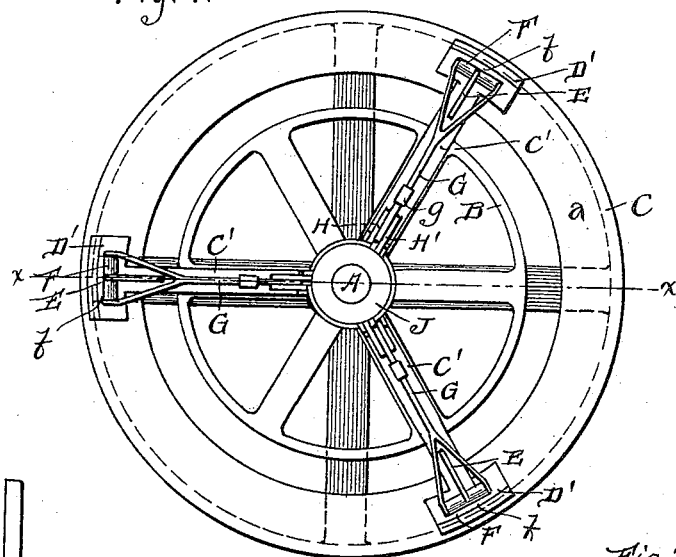
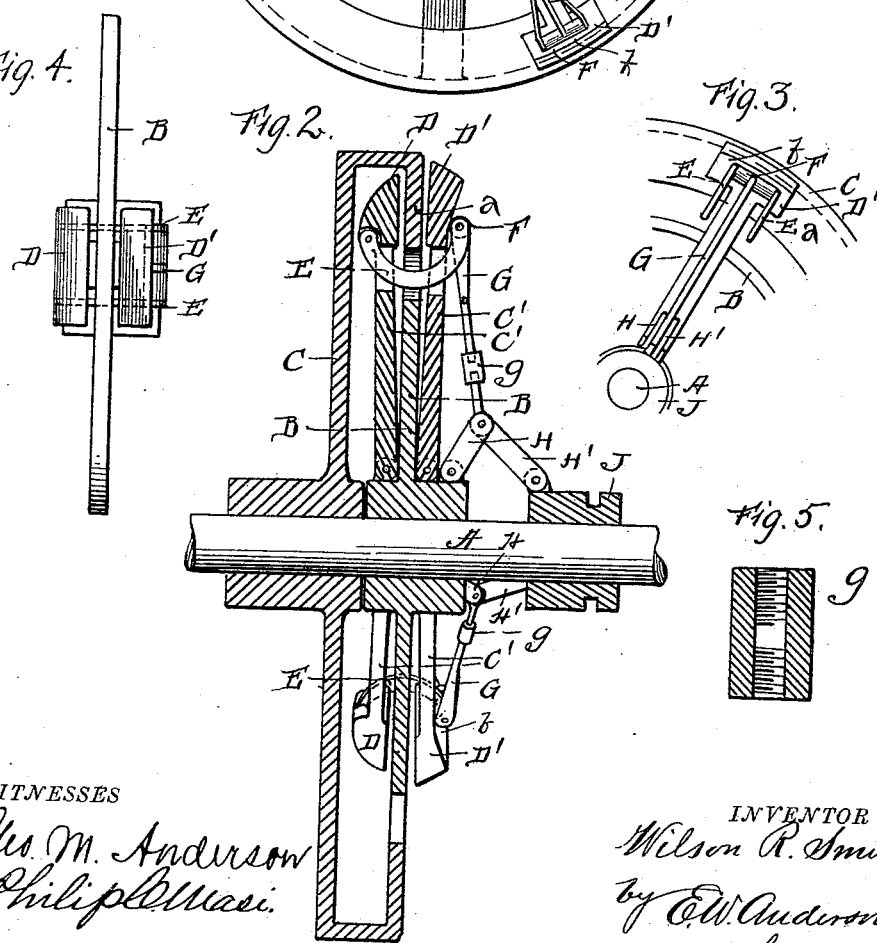
WITNESSES
Geo. M. Anderson
Philip O. Masi.
INVENTOR
Wilson R. Smith
by E. W. Anderson
his Attorney
THE NORRIS PETERS CO., PHOTO-LITHO., WASHINGTON, D. C.

UNITED STATES PATENT OFFICE.

WILSON R. SMITH, OF BELOIT, ASSIGNOR OF ONE-HALF TO JAMES B. HATCH, OF MILWAUKEE, WISCONSIN.

FRICTION-CLUTCH.

SPECIFICATION forming part of Letters Patent No. 529,314, dated November 13, 1894.

Application filed July 3, 1894. Serial No. 516,472. (No model.)

*To all whom it may concern:*

Be it known that I, WILSON R. SMITH, a citizen of the United States, and a resident of Beloit, in the county of Rock and State of Wisconsin, have invented certain new and useful Improvements in Friction-Clutches; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the invention. Fig. 2 is a partly sectional view on line $x$—$x$, Fig. 1. Fig. 3 is a side elevation of a portion of the two wheels, showing modification. Fig. 4 is a plan view of the driver wheel showing modification. Fig. 5 is a detail of the sleeve nut.

This invention has relation to certain new and useful improvements in friction clutches, the object being to provide means of improved character for actuating the grip jaws to give them a secure bearing upon the grip ring.

With this object in view, the invention consists in the novel construction and combination of parts, all as hereinafter described and pointed out in the appended claims.

Referring to the accompanying drawings, the letter A designates a driving shaft; B, a driver wheel fast thereon; C, a driven wheel loosely mounted on said shaft, and having a grip-flange $a$; and C' the grip arms carried by said driver wheel, and arranged in pairs all as commonly arranged. Each grip arm carries a jaw, the inner jaw of each pair being designated by the letter D, and the outer jaw by D'. Pivoted to the jaw D is a curved or arcuate draw-bar E, which extends through slots in the jaws and at its opposite end portion carries a roller F which is arranged to travel on an incline $b$ formed on the outer face of the outer jaws D'. Pivoted to the said draw-bar, near said roller is a link or lever arm G, which at its lower end is jointed to toggles H, H', one of which is connected to the lower portion of the outer grip arm, and the other to the actuating collar J which slides upon the shaft A. Said link or lever G is formed in two sections united by a sleeve nut $g$ having a right and left thread, and affording means for giving said link or lever proper tension.

As the sliding collar J is moved toward the driver by the operation of the clutch lever, the toggle H is straightened out, the roller F is forced up the incline $b$, drawing the jaws together in a secure grip on the grip flange. The curved draw-bar applies the pressure near the end of jaws, where most required.

Fig. 3, shows a modification of the invention wherein two of the draw-bars E are employed, extending one upon each side of the grip jaws.

Having thus described my invention, what I claim as new, and desire to secure by Letters Patent, is—

1. In a friction clutch, the grip jaws D, D', the jaw D' having the incline $d$, one or more curved draw-bars pivoted to the jaw D, the roller carried by said draw-bars, and working against said incline, the link or lever connected to said draw-bars, the sliding collar on the driving shaft, and the toggles connecting said link and lever with said collar and with the driver wheel, substantially as specified.

2. A friction clutch, having the grip jaws D, D', the curved draw-bar E, the incline $b$, the roller F carried by said draw-bar and working against said incline, the link or lever G, formed in two parts, the right and left threaded sleeve nut connecting said parts, the toggles H, H', connected to said lever, and the sliding collar to which the toggle H is connected, substantially as specified.

In testimony whereof I affix my signature in presence of two witnesses.

WILSON R. SMITH.

Witnesses:
Miss L. B. SMITH,
R. J. BURDGE.